(12) United States Patent
Hayes et al.

(10) Patent No.: US 8,558,676 B2
(45) Date of Patent: Oct. 15, 2013

(54) DIGITAL INTERCONNECT OF ENTERTAINMENT EQUIPMENT IN THE HOME

(75) Inventors: Patrick H. Hayes, Mission Viejo, CA (US); Gregory L. Johns, Carlsbad, CA (US); James N. Conway, Jr., Corona Del Mar, CA (US)

(73) Assignee: Universal Electronics Inc., Santa Ana, CA (US)

( * ) Notice: Subject to any disclaimer, the term of this patent is extended or adjusted under 35 U.S.C. 154(b) by 627 days.

(21) Appl. No.: 12/716,365

(22) Filed: Mar. 3, 2010

(65) Prior Publication Data
US 2010/0157171 A1 Jun. 24, 2010

Related U.S. Application Data

(63) Continuation of application No. 11/818,295, filed on Jun. 14, 2007, which is a continuation of application No. 10/665,642, filed on Sep. 19, 2003, now Pat. No. 7,586,398, which is a continuation-in-part of application No. 10/151,635, filed on May 20, 2002, now Pat. No. 7,218,243, which is a continuation-in-part of application No. 09/615,473, filed on Jul. 13, 2000, and a continuation-in-part of application No. 09/334,584, filed on Jun. 16, 1999, now Pat. No. 6,781,518, which is a continuation-in-part of application No. 09/121,229, filed on Jul. 23, 1998, now Pat. No. 6,157,319, said application No. 10/151,635 is a continuation-in-part of application No. 09/905,423, filed on Jul. 13, 2001, now abandoned, application No. 12/716,365, which is a continuation-in-part of application No. 10/288,727, filed on Nov. 6, 2002.

(60) Provisional application No. 60/264,767, filed on Jan. 29, 2001, provisional application No. 60/344,020, filed on Dec. 20, 2001, provisional application No. 60/334,774, filed on Nov. 20, 2001.

(51) Int. Cl.
*G08C 17/00* (2006.01)

(52) U.S. Cl.
USPC ... 340/12.28; 340/4.3; 340/12.23; 340/12.25; 340/12.3; 341/176; 348/734

(58) Field of Classification Search
USPC .................. 340/12.28, 4.3, 4.32, 10.5, 12.23, 340/12.25, 12.3, 12.53, 12.54; 341/176; 348/734; 398/106, 107, 112
See application file for complete search history.

(56) References Cited

U.S. PATENT DOCUMENTS 4,626,848 A 12/1986 Ehlers
4,703,359 A * 10/1987 Rumbolt et al. ............... 348/734

(Continued)

FOREIGN PATENT DOCUMENTS

DE 19709800 A1 9/1998
EP 0513443 A1 11/1992

(Continued)

OTHER PUBLICATIONS

Ingrid Wickelgren, Apr. 1997, IEEE Spectrum, vol. Apr. 1997, pp. 20-25.

*Primary Examiner* — Edwin Holloway, III
(74) *Attorney, Agent, or Firm* — Greenberg Traurig, LLP

(57) ABSTRACT

A method for configuring a controlling device to command functional operations of at least one controllable appliance. The method includes the steps of receiving at the controlling device from the at least one controllable appliance, via a first communication channel, data indicative of an identity of the at least one controllable appliance and using the data indicative of the identity of the at least one controllable appliance to configure the controlling device whereby, in response to activation of one or more command keys of the controlling device, the controlling device will be caused to transmit to the at least one controlling device, via a second communication channel, those commands selected from a library of commands that are appropriate for commanding functional operations of the at least one controllable device.

21 Claims, 10 Drawing Sheets

(56) References Cited

U.S. PATENT DOCUMENTS

| | | | |
|---|---|---|---|
| 4,746,919 A | 5/1988 | Reitmeier | |
| 5,255,313 A | 10/1993 | Darbee | |
| 5,410,326 A | 4/1995 | Goldstein | |
| 5,438,325 A | 8/1995 | Nishigaki et al. | |
| 5,452,291 A | 9/1995 | Eisenhandler et al. | |
| 5,519,457 A | 5/1996 | Nishigaki et al. | |
| 5,537,104 A | 7/1996 | Van Dort et al. | |
| 5,552,917 A | 9/1996 | Darbee et al. | |
| 5,565,855 A * | 10/1996 | Knibbe | 340/3.51 |
| 5,689,663 A | 11/1997 | Williams | |
| 5,726,645 A | 3/1998 | Kamon et al. | |
| 5,839,097 A | 11/1998 | Klausner | |
| 5,909,183 A | 6/1999 | Borgstahl et al. | |
| 5,949,351 A | 9/1999 | Hahm | |
| 5,959,539 A | 9/1999 | Adolph et al. | |
| 5,990,884 A | 11/1999 | Douma et al. | |
| 6,133,847 A | 10/2000 | Yang | |
| 6,148,241 A | 11/2000 | Ludtke et al. | |
| 6,157,319 A | 12/2000 | Johns et al. | |
| 6,160,491 A | 12/2000 | Kitao et al. | |
| 6,505,780 B1 | 1/2003 | Yassin et al. | |
| 6,781,518 B1 | 8/2004 | Hayes et al. | |
| 2001/0033243 A1 | 10/2001 | Harris et al. | |
| 2001/0043145 A1 | 11/2001 | Jacob, Jr. | |
| 2003/0141987 A1 | 7/2003 | Hayes | |
| 2010/0039282 A1 | 2/2010 | Hostage et al. | |

FOREIGN PATENT DOCUMENTS

| | | |
|---|---|---|
| JP | 05083765 | 4/1998 |
| WO | 00/13344 A1 | 3/2000 |

\* cited by examiner

| # | DEVICE TYPE:TV Function | # | DEVICE TYPE:VCR Function |
|---|---|---|---|
| 1 | Power | 1 | Power |
| 2 | Volume up | 2 | Play |
| 3 | Volume down | 3 | Stop |
| 4 | Mute | 4 | Fast forward |
| 5 | Channel up | 5 | Rewind |
| 6 | Channel down | 6 | Pause |
| 7 | 0 | 7 | Record |
| 8 | 1 | 8 | Slow+ |
| 9 | 2 | 9 | Slow− |
| 10 | 3 | 10 | Frame advance |
| 11 | 4 | 11 | Tracking+ |
| 12 | 5 | 12 | Tracking− |
| 13 | 6 | 13 | Index search foward |
| 14 | 7 | 14 | Index search reverse |
| 15 | 8 | 15 | Stereo/mono |
| 16 | 9 | 16 | Channel+ |
| 17 | 0 | 17 | Channel− |

FUNCTION IDENTIFIERS FOR TV AND VCR DEVICES

FIG. 4A

| DEVICE TYPE:TV | | DEVICE TYPE:VCR | |
|---|---|---|---|
| # | Function | # | Function |
| 18 | Enter | 18 | 1 |
| 19 | Previous channel | 19 | 2 |
| 20 | Input select | 20 | 3 |
| 21 | Menu | 21 | 4 |
| 22 | Menu up | 22 | 5 |
| 23 | Menu down | 23 | 6 |
| 24 | Menu left | 24 | 7 |
| 25 | Menu right | 25 | 8 |
| 26 | Select | 26 | 9 |
| 27 | Exit | 27 | 0 |
| 28 | Closed caption on/off | 28 | Enter |
| 29 | Sleep timer | 29 | TV/VCR |
| 30 | Brightness + | 30 | Menu |
| 31 | Brightness − | 31 | Menu up |
| 32 | Tint + | 32 | Menu down |
| 33 | Tint − | 33 | Menu left |
| 34 | Surround On/off | 34 | Menu right |
| 35 | Rear vol + | 35 | Select |
| 36 | Rear vol − | 36 | Volume + |
| 37 | Center vol+ | 37 | Volume − |
| 38 | Center vol − | 38 | Mute |
| 39 | Favorite channel + | 39 | VCR plus |
| 40 | Favorite channel − | 40 | Program |
| 41 | +100 | 41 | ... |
| 42 | Display on/off | 42 | ... |
| 43 | ... | 43 | ... |
| ... | Etc. | ... | Etc. |

FUNCTION IDENTIFIERS FOR TV AND VCR DEVICES

FIG. 4B

| DEVICE TYPE:TV | | DEVICE TYPE:VCR | |
|---|---|---|---|
| # | Function | # | Function |
| 1 | Power | 1 | Power |
| 2 | Volume +/- & Mute | 2 | Transport: Play/stop/FF/REW/Pause |
| 3 | Channel +/- | 3 | Record |
| 4 | Digit group 0 through 9 | 4 | Slow adjust |
| 5 | Enter | 5 | Frame advance |
| 6 | Channel down | 6 | Tracking adjust |
| 7 | Previous channel | 7 | Index search foward |
| 8 | Input select | 8 | Index search reverse |
| 9 | Menu on | 9 | Stero/mono |
| 10 | Menu navigation: up/dwn/left/right | 10 | Channel +/- |
| 11 | Select | 11 | Digit group 0 through 9 |
| 12 | Exit | 12 | Enter |
| 13 | Closed caption on/off | 13 | TV/VCR |
| 14 | Sleep timer | 14 | Menu on |
| 15 | Brightness adjust | 15 | Menu navigation: up/dwn/left/right |
| 16 | Tint adjust | 16 | Select |
| 17 | Surround on/off | 17 | Volume +/- & Mute |
| 18 | Rear volume +/- | 18 | VCR plus |
| 19 | Channel volume +/- | 19 | Program |
| 20 | Favorite channel+/- | 20 | ... |
| 21 | +100 | 21 | ... |
| 22 | Display on/off | 22 | ... |
| 23 | ... | 23 | ... |
| 24 | Etc. | 24 | Etc. |

TV AND VCR FUNCTIONS—COMPACT REPRESENTATION

FIG. 5

| | |
|---|---|
| "00" | Flag indicating that the following data is a new function definition |
| "xx" | Count of how many bytes of definition information follow |
| "yyyyy" | Definition IR code to be sent, using, for example, the three digit function synthesis format described in U.S. Patent 5,515,052. Note that this value is in ASCII or similar representation to avoid itself including a "00" byte. |
| "zzzz....zz" | (Optional) Text label for the new function, if the remote has the capability to display this. |

NEW FUNCTION DEFINITION DATA BLOCK

FIG. 6

Frame format:

Bit format:

Sub carrier format:

Each frame transports 8 bytes of data.
Bytes are transmitted least significant bit first.

FCD"01,02"

FCD"01,02,03,10,11"

FCD"01,02,03,04,05,10,11"

FCD"01,02,00,11,39,38,31,78,
84,83,67,47,80,65,76"

DIGITAL INTERCONNECT OF ENTERTAINMENT EQUIPMENT IN THE HOME

RELATED APPLICATIONS

This application claims priority to and is a continuation of U.S. application Ser. No. 11/818,295, filed on Jun. 14, 2007, which application claims priority to and is a continuation of U.S. application Ser. No. 10/665,642, filed on Sep. 19, 2003, which is a continuation-in-part of U.S. application Ser. No. 10/151,635, filed May 20, 2002, (now U.S. Pat. No. 7,218,243) which is: 1) a continuation-in-part of U.S. application Ser. No. 09/615,473, filed Jul. 13, 2000; 2) a continuation-in-part of U.S. application Ser. No. 09/334,584, filed Jun. 16, 1999, (now U.S. Pat. No. 6,781,518) which is a continuation-in-part of U.S. application Ser. No. 09/121,229, filed Jul. 23, 1998 (now U.S. Pat. No. 6,157,319); and 3) a continuation-in-part of U.S. application Ser. No. 09/905,423, filed Jul. 13, 2001, which claims priority to U.S. Provisional Application Ser. No. 60/264,767, filed on Jan. 29, 2001.

This application also claims priority to and is a continuation-in-part of U.S. application Ser. No. 10/288,727, filed Nov. 6, 2002, which claims priority to U.S. Provisional Application Ser. No. 60/344,020, filed Dec. 20, 2001, and U.S. Provisional Application Ser. No. 60/334,774, filed Nov. 20, 2001.

BACKGROUND

In an electronic system, such as an entertainment system, to be remotely operated, it is advantageous for a remote control to be able to configure itself to match the capabilities of the particular appliance to be controlled at that particular time by the remote control. In those devices known as universal remote controls, this capability is particularly useful since such remote controls have a generally generic keypad layout that can be used to control different remotely operable devices. Corresponding U.S. patent application Ser. No. 09/121,229 filed on Jul. 23, 1998 in the name of Universal Electronics Inc. and entitled "Universal Remote Control System With Device Activated Setup," which is incorporated herein by reference, discloses a method wherein a newly installed consumer electronic appliance activates the setup of an existing universal remote control by transmitting to the remote control a signal identifying the type of appliance just installed and the infrared ("IR") remote control format to which it responds.

It has been found that additional information is required after the device activated setup; that is, even after the device activated setup identification process has taken place, the exact capabilities of the device to be remotely controlled are still not completely known to the remote control. For example, while the device may have identified itself as a Sony TV responding to Sony's infrared control format, the remote control still does not know whether this particular model of Sony TV is equipped with picture-in-picture, surround sound, or other features which are not necessarily available on every model of TV set Sony builds and/or sells.

Methods have been considered to expand the code used during the device activated setup to allow unique identification of each specific model of every manufacturer's range of devices. However, for practical purposes, storing a cross-reference to every possible permutation and combination of features within a pre-programmed universal remote control is not feasible, either from a memory space or a non-obsolescence standpoint. The present invention is directed to, among other objects, providing a more viable solution to the problem.

SUMMARY

In accordance with an embodiment of the present invention, during the set up process, the functional capability definition ("FCD") data is transferred to the remote control using an extension of, and improvement on, the IR transmission protocol already defined in the aforementioned patent application which, as noted, is incorporated herein.

In this invention, the device to be controlled (TV, VCR, etc.) conveys, or is caused to convey, a summary of its capabilities to the remote control. In one inventive method, the remote control need only recognize and process a single set of standard abstract feature indicators, and map these indicators on specific IR codes and keys according to a list of capabilities provided by the controlled device. In a preferred embodiment, the remote control includes an LCD display panel and touch screen input capability, allowing it to display only those key functions applicable to the specific device being controlled. This reduces the likelihood that a user will be confused by the presence of extraneous keys. This invention further describes encoding schemes and methods and communication protocols for conveying this information to the remote control from a specific device. This may be an extension, or an additional capability, of the device activated setup described in the aforementioned application.

The invention discloses a method and system for setting up a universal remote control for operation with a device to be controlled (TV, VCR, etc.), including the steps of providing a listing of standard feature indicators as to the capabilities of each device to be controlled. The indicators are provided from the device to be controlled to the remote control. The indicators are processed by the remote control which maps said indicators into specific IR codes and keys according to the list of capabilities of the device to be controlled.

The invention includes a method for setting up a control unit for operation with a device to be controlled. The method comprises the steps of: transmitting from the control unit to the device to be controlled a request for configuration information; transmitting a listing of controllable functions of the device to be controlled from the device to be controlled; recognizing a set of function indicators, each of the indicators corresponding to a respective function to be controlled from the listing of controllable functions; mapping the functions into specific codes and keys according to the listing of controllable functions of the device: and storing the resulting configuration information.

Another embodiment of the invention includes a control system for electronically controlled devices wherein the system comprises: a standard high performance bus connecting the electronically controlled devices; a signal responsive universal remote control providing a user interface; and an interface adaptor communicating with the bus. The adapter preferably includes a signal transceiver, a bus interface unit, and a micro controller connected to control two-way communications between the signal transceiver and the bus interface unit to selectively obtain capability information from one of the electronically controlled devices connected to the bus.

Another method of the invention includes controlling electronically controlled devices via a universal remote control. The method includes the steps of: interconnecting the devices using a standard high performance bus to enable communication between devices at a digital level; connecting an interface adaptor to the bus; providing the interface adaptor with the capability of communicating via IR to a universal remote control; soliciting information from the devices on the bus; and communicating the solicited information via a two-way communication link between the remote control and at least one of the devices to control the device, or devices, via the universal remote control.

A further method is directed to configuring a controlling device to command functional operations of at least one controllable appliance. This method includes the steps of receiving at the controlling device from the at least one controllable appliance, via a first communication channel, data indicative of an identity of the at least one controllable appliance and using the data indicative of the identity of the at least one controllable appliance to configure the controlling device whereby, in response to activation of one or more command keys of the controlling device, the controlling device will be caused to transmit to the at least one controlling device, via a second communication channel, those commands selected from a library of commands that are appropriate for commanding functional operations of the at least one controllable device.

The invention also envisions a control system providing: a plurality of devices connected via a bus conforming to a first standard, wherein the devices communicate according to a second standard; a plurality of devices, including a target device having context determined data defining a plurality of functions supported by the target device and a plurality of associated icons; an adaptor in operable communication with the bus to receive context determined data from the target device and send context determined data to the target devices; and a remote control in operable communication with the adaptor to send and receive context determined data.

The invention also includes a control system for controlling devices connected through a bus conforming to an IEEE 1394 standard and communicating according to a HAVi standard. The system includes: an adaptor communicating with one of the devices: and a remote control in communication with one of the devices via the adaptor. The remote control is configured by one of the devices by communicating context determined data to the remote control.

Other objects and advantages of the present invention will apparent from the following detailed discussion of preferred and exemplary embodiments with references to the attached drawings and claims.

BRIEF DESCRIPTION OF DRAWINGS

The following list of drawings will be useful in understanding the principles of the invention and in enabling those skilled in the art to practice the invention.

FIG. 4a is a partial table, or listing, of a TV and a VCR and respective type functions of those devices.

FIG. 4b is a continuation of the partial table shown in FIG. 4a.

FIG. 5 is a table or listing of TV and VCR functions, wherein the functions are grouped to provide a compact or compressed version of the respective functions.

FIG. 6 is a table or listing showing reserved numbering or lettering for indicating a new function.

DETAILED DESCRIPTION

Figure 1A:
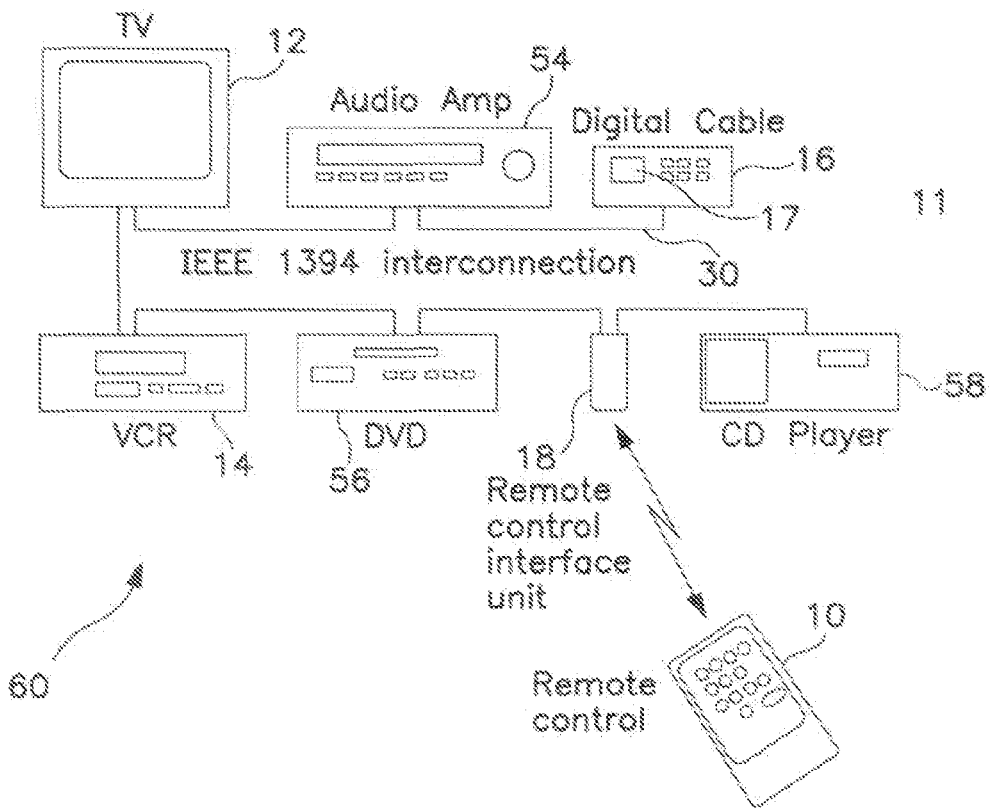
FIG. 1a is a pictorial sketch of an interconnected entertainment system. A remote control is shown controlling various components of the system, including a TV set and a VCR.

The acronyms in the following list are used in this application:
CD—compact disk
CE—consumer electronics
DAS—device activated setup
DDI—data driven interaction interface
DVD—digital video disk
ESPN—a station (TV channel)
FCD—functional capability definition
FCM—functional control module
HAVi—home audio video interoperability
IC—integrated circuitry
IEEE 1394—IEEE standard for high performance serial bus
IR—infrared
IrDA—standard protocol Infrared Data Association
LCD—liquid crystal display
NTSC—a television transmission format
PAL—a television transmission format popular in Europe
PIC—a type of micro controller from Microchip Corp.
POD—power on data
STB—cable set top box
TWIRP—two way IR protocol The present invention relates to devices for controlling other devices remotely; other uses will be apparent from the teachings disclosed herein. Particular embodiments of this invention relate to remotely controlling devices capable of communicating with the remote control. The present invention will be best understood from the following description of preferred and exemplary embodiments with reference to the attached drawings, wherein like reference numerals and characters refer to like parts and with reference to the following claims. It will be understood that, generally, only enough of an exemplary embodiment has been shown in the drawings in order to enable those skilled in the art to understand the underlying principles and concepts of the invention while simplifying the illustration of the drawings.

Figure 1B:
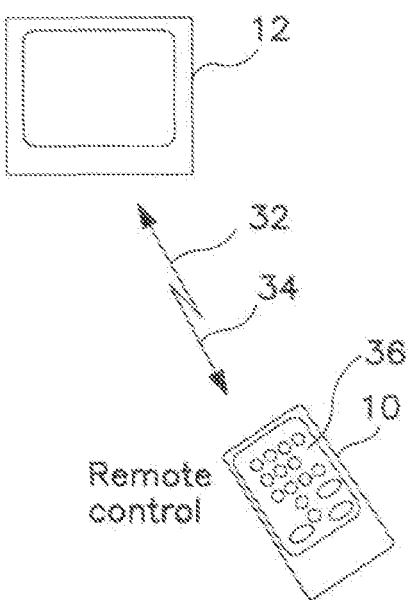
FIG. 1b depicts two-way communication between a remote control and a TV, whereby the TV may provide capability data, for example, to the remote control.

FIG. 1a shows a pictorial view of a remote control 10 for controlling an associated home entertainment system 11 including a TV set 12 and a VCR 14. Preferably the system components have two-way communication capability, in accordance with a preferred embodiment of the invention. For explanatory purposes, FIG. 1b shows a simplified system wherein a single system component, the TV set 12, is controlled by the remote control 10. The "Device Activated Setup" (DAS) method described in the aforementioned U.S. patent application Ser. No. 09/121,229 is utilized for the initial set up for remote control operation. After the initial set up, the function identity and operating parameters are established in accordance with the present invention.

Figure 2:
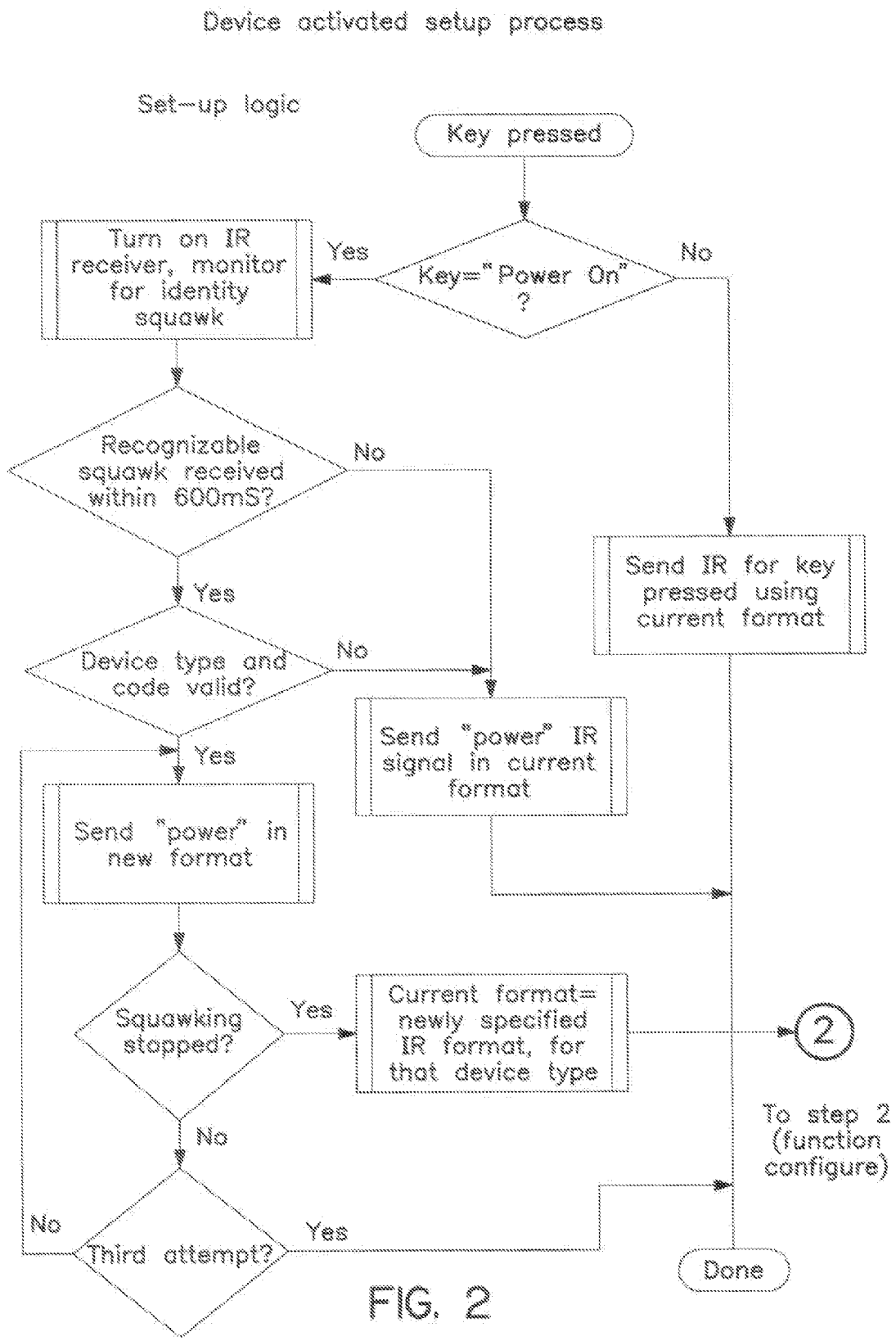
FIG. 2 is a flow chart depicting a device activated setup process for setting up the remote control.

FIG. 2 is a flowchart, similar to that shown in the patent application discussed in the background section, depicting how such data is processed by the remote control for the initial set up process. This flowchart, however, depicts an improvement according to the present invention. The link "step 2-function configuration" represents an improvement and an extension of the basic DAS process to encompass acquisition of FCD data for the device to be controlled.

Figure 3:
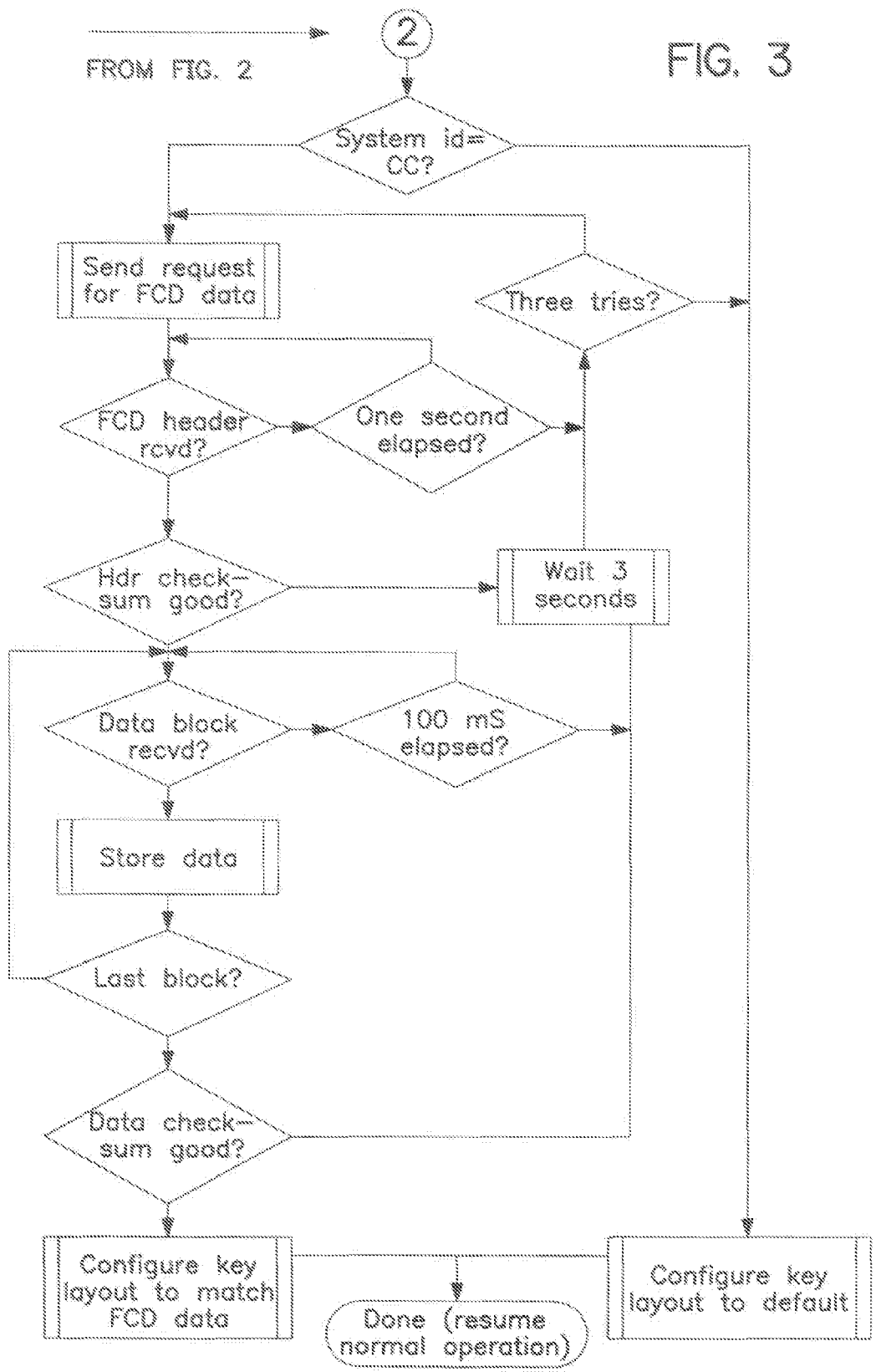
FIG. 3 is a flow chart depicting the continuation of the processing of the data to configure the key layout of the remote control to match the data from the controlled device.

The function configuration process, which is shown in the flowchart of FIG. 3, will now be explained. For each type of device to be supported (to be controlled), a set of possible functions is defined and each function assigned a unique numeric identifier. In the initial implementation, up to 256 possible values are allowed, thereby enabling each to be represented by a single byte of data.

An example of two such function sets are shown in FIGS. 4a and 4b for a TV and a VCR. Similar tables are constructed for each additional device type to be supported (controlled). The number identifiers in the table of FIGS. 4a and 4b do not themselves define what IR signal is to be sent to the controlled (target) device to effect the function; the numbers simply indicate to the remote control which functions a particular device supports. The exact format of the IR signal to be sent is already known to the remote control, as is the key data. Alternatively, this data could be provided subsequently.

The table of FIGS. 4a and 4b includes several groups of functions which could reasonably be expected to appear. Additionally, the groups often comprise families of related functions. For example, the family comprising "Volume Up" and "Volume Down," and the family comprising "Play" and "Stop," could both be included, as a "group". From the teachings herein it will be understood that the family relationship may be defined in terms of a functional relationship, such as audio control; an entertainment relationship, such as audio control of source "a" and image control of source "b" and signal selection control of source "c"; a device relationship, such as VCR or Digital Satellite; as well as a task optimized or a user defined relationship. Other families and groupings will be apparent to those of skill in the art.

FIG. 5 shows that grouping such functions under a single designator results in a more compact representation, or table. While both representations can be used effectively, the compact version of FIG. 5 is used herein.

Refer now to FIGS. 8a-8d. As an example of the uses of the identifiers, a simple "playback only" VCR could completely identify its functionality to a remote control by sending to the remote control two bytes of data: "01" followed by "02" (see FIG. 8a). If another model in that range featured recording capability and a channel tuner in addition to the basic capabilities, that model would identify its capabilities by sending a string, "01,02,03,10,11," to the remote control (see FIG. 8b). Another model having additional features of slow motion capability would send the string "01,02,03,04,05,10,11" (see FIG. 8c). The remote control is then able to tailor its presentation of functions to the user to match the exact device being controlled. There is no ambiguity in assigning the same function number to different functions across devices, since the device type is already known to the remote control as a result of the initial DAS.

FIG. 6 shows an assignment of a number to allow for future expansion and/or addition of new functions not included in the initial function number assignments. As shown in FIG. 6, and as an example, "00" is reserved to indicate that the data following "00" is a definition of a new IR code and function. So, for example, if the VCR above were a dual format deck which allowed the user to switch between playing tapes recorded in NTSC and PAL formats, it might define a "format switching" function key to the remote control by sending the following data to the remote (see FIG. 8d):

"01,02,00,11,39,38,31,78,84,83,67,47,80,65,76"

Where:

"01,02" represents the basic functionality of the unit, as before (power plus transport key group only);

"00" represents the start of the special function definition sequence;

"11" is the number of bytes of data following;

"39,38,31" is an ASCII representation of the infrared key data to be set for this value, as disclosed in U.S. Pat. No. 5,515,052, which is hereby incorporated herein by reference. This value is the digit key of the IR code, (981 in this case); and "78,84,83,67,47,80,65,76" is the ASCII representation of the key label to be used, ("NTSC/PAL" in this case).

Besides "00," one other special character—the value "255" is reserved. This is used for packet formatting purposes and will be described further below.

FIGS. 8a, 8b, 8c and 8d thus illustrate how a remote control equipped with an LCD touch screen input means might configure its display in response to each of the four different VCR capability data strings used in the above example.

FCD Identification

During the set up process, the functional capability definition (FCD) data is transferred to the remote control using and extension of the IR transmission protocol defined in the application cited above. While other device identity approaches consistent with the instant invention will be apparent to those of skill in the art, the 32-bit device identity value utilized in said application is also utilized herein for convenience.

The ID value is as follows:

8 bits System identification (to differentiate between devices of differing capabilities and/or allow multiple versions of this system to co-exist without interfering with one another's settings).

4 bits Device Category, as follows:

00 TV
01 VCR
02 Cassette Tape
03 Laser Disk
04 Digital Audio Tape
05 Cable Box
06 Satellite IRD
07 Video Accessory
08 CD Player
09 Amplifier
10 Tuner
11 Home Auto Device
12 Miscellaneous Audio
13 Phonograph
14 DVD
15 Spare
12 Device number (set up code in the pre-programmed library)
8 Check byte (longitudinal parity of the preceding three bytes).

With reference to FIG. 3, upon completion of a successful DAS, the 8-bit system identification value from the DAS data is examined. If this value indicates that the transmitting device does not support the extensions described here, the remote control setup is complete and it resumes normal operation. If, on the other hand, the system identification value indicates that the device supports capability reporting then the remote control continues by requesting from the device its FCD data string. This request will usually take the form of a single specific remote control IR command (i.e., the equivalent of a key press) sent to the target CE device in its standard format (i.e., the format established during the DAS process). By agreement with the manufacturer of that device, that particular command will be recognized by the CE device as a request to transmit to the remote control an FCD of the form described above.

Data From CE Devices Transmitted to the Remote Control

The data is transmitted from the CE device to the remote control using a variant of the DAS link level protocol. First, the FCD data is divided into eight-byte blocks. The final block is padded as necessary with FF ("255") values to bring it to exactly eight bytes. An eight byte header block is then constructed as follows:

1 byte Length (represents the number of 8-byte blocks present of header (to allow for future expansion, currently fixed at 1))

1 byte Length of data to follow (excluding header block)

2 byte Data checksum (calculated across all bytes of data, including pad bytes but excluding header)

3 bytes Reserved for future expansion 1 byte Header checksum (calculated across the seven preceding bytes)

The above data is transmitted to the remote control using a variant of the DAS link level protocol as will be described below. It has been found preferable that this data and the DAS use the same transmit and receive hardware, i.e., carrier frequency and pulse timing. However, for some applications it is preferable to utilize separate transmit and receive hardware. The DAS protocol follows:

Encoding: Burst duration modulation using amplitude shift keyed IR subcarrier

Subcarrier: 40 KHz, +/−0.5%

Figure 7A:
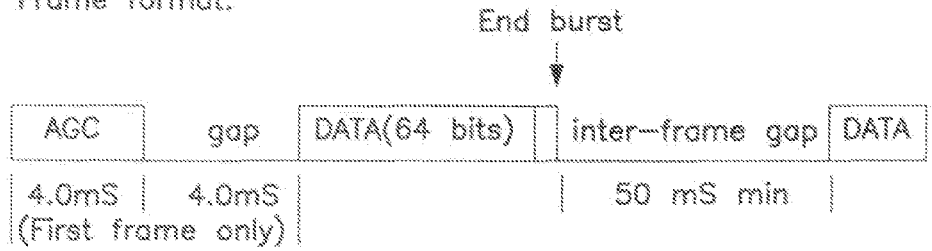
FIGS. 7a-7c depict the frame format, the bit format and the sub-carrier format, respectively, for the data.
Figure 7B:
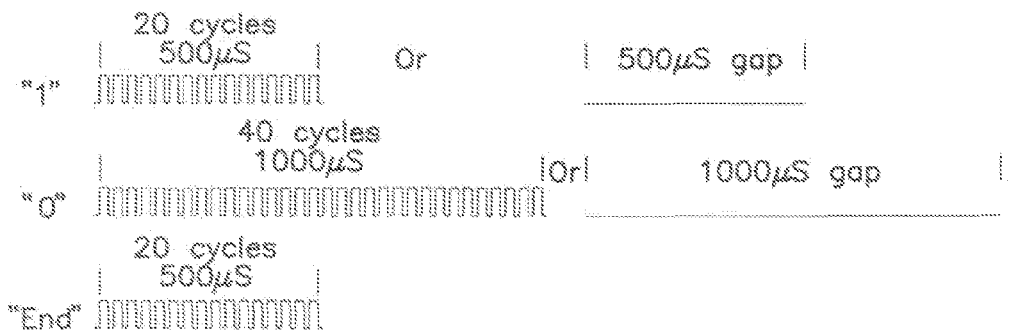
Figure 7C:
Figure 7D:
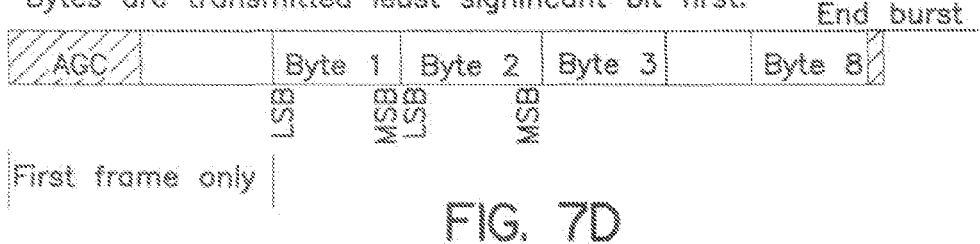
FIG. 7d depicts the byte and data format corresponding to FIGS. 7a-7c.

(FIG. 7(c))

Bit Encoding: Basic time interval t=500 us (20 cycles of subcarrier)

(FIG. 7(b)) Burst times (nominal) 1 t and 2 t

Gap times (nominal) 1 t and 2 t

Frame Format: Bits per frame: 64 (8 bytes)

(FIG. 7(a))

Preamble burst: 4.0 ms (8 t) (first frame only)

Interframe Gap: 50 ms minimum (FIG. 7(a))

FCD Installation

The encoded data stream consists of alternating intervals of carrier and no carrier. The duration of each interval signals the value of the bit corresponding to that location. Ones are represented by short intervals, zeros by long intervals. FIGS. 7a-7d shows the format in detail.

As indicated in the flowchart of FIG. 3, if the remote control receives the FCD data successfully, it configures itself as appropriate for operation of that device and resumes normal operation. If for any reason the data is not received successfully (truncated number of packets, bad checksum(s), etc.) the remote control will wait an appropriate period of time and then repeat the request. If after three such attempts the data has still not been obtained, the remote control will abort the process and revert to default operation-usually, supporting the maximum set of possible functions for that device family.

Note that although the above embodiment and example transactions assume that the DAS and FCD acquisition will usually occur together, there is in fact nothing in the protocol which prevents the remote control from issuing a request for POD data at any time. Thus, the remote control could avail itself of this information at any time.

Interoperability Architecture

The next generation of consumer entertainment appliances uses digitally encoded audio and video signals. Transfer of program material between these devices in the original digital format, such as for example, between a digital cable box and a high definition TV set is highly desirable in order to take full advantage of the superior picture and sound quality which is obtainable therefrom.

Various standards are being proposed which are intended to provide uniform methods of digital interconnection between devices. These standards generally specify not only how to transfer audio video source materials, but also how to effect the exchange of control functions between devices, since it is relatively easy to interleave these different signals on a single interface when they are encoded at the digital level. An example of such standard is the Home Audio Video interoperability (HAVi) architecture specification proposed by a group of major CE manufacturers. The inventive methods disclosed herein are applicable to HAVi and, generally, to other such standards that determine parameter passing and interaction between devices. The actual physical and electrical connections and the link-level protocols used form the subject of a different specification, IEEE 1394 "Standard for a High Performance Serial Bus." Present suggested standards are directed primarily to home entertainment appliances, however the methods disclosed are applicable to other appliances in the home such as the control of lighting, personal computers, security, communications, sprinklers and other convenience items.

The HAVi allows control information to be transferred between devices at two levels; the first, referred to as the functional control module (FCM) interface defines a set of standardized commands for each device type (such as play/stop/pause for a VCR device, channel change for a TV tuner, etc.). Not all devices necessarily support all possible commands (e.g. a VCR may not support "indexed skip") so provision is made for a device to enumerate its capabilities in response to a query from another device on the bus. In the FCM interface method, this enumeration consists of a simple list of which standard functions are or are not supported by the device (say VCR); and, the controlling device (say remote) determines the look and feel of the user interface. The controlled device simply accepts commands from the controlling device.

The second method, referred to as the data driven interaction (DDI) interface, allows the target device to specify to the controlling device a complete user interface, including the exact icons to display for each function, labels for functions, data and status displays, etc. The controlling device simply presents these to the user and reports back to the controlled device which icon was selected. In other words, unlike FCM, in this scheme the controlled device determines the look and feel of the user interface, the controlling device simply acts as intermediary between it and the user.

Figure 9:
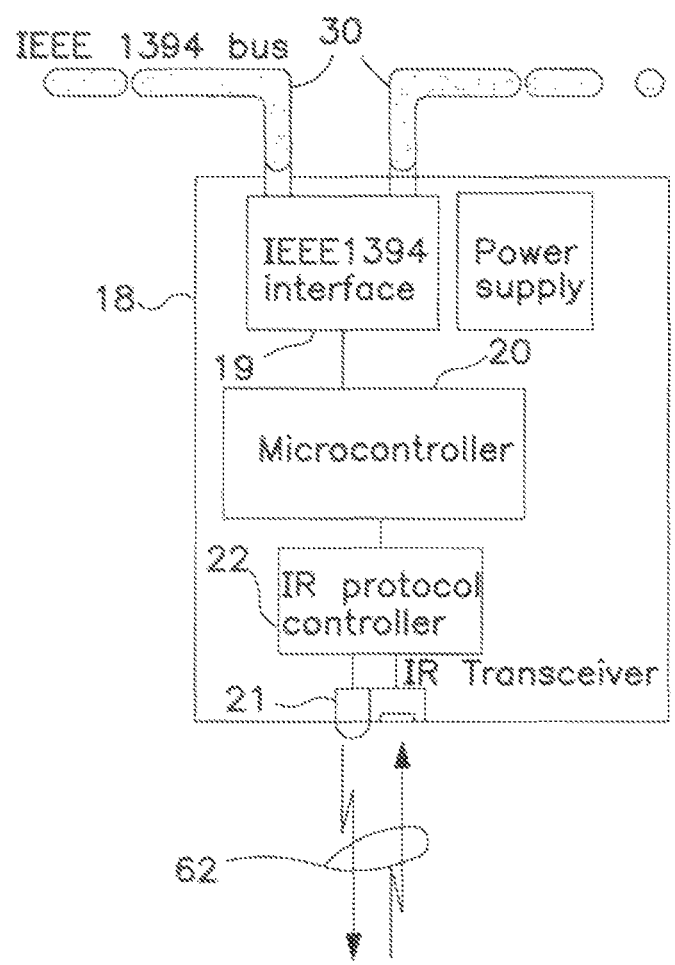
FIG. 9 is a block diagram indicating an interconnection to a standard serial bus.

Refer now to FIGS. 1a and 9 depicting HAVi compliant devices. With HAVi compliant devices, a remote control of the type described herein can be utilized by providing an adaptor device which attaches to the IEEE 1394 bus. The adaptor solicits capability information from other appliances on the bus and communicates these to the remote control via a two-way communication link. In other words, a single HAVi compatible adaptor device can provide remote configuration services for all consumer appliances connected to the bus, instead of each one individually supplying its DAS data directly to the remote control. The remote control can issue user commands to an appliance either by relaying them back through this same adaptor device or by communicating directly with the appliance, whichever is best supported by the appliance in question. The adaptor device can be either a "stand alone" unit or incorporated within some other appliance (e.g. cable set top box "STB").

A remote control which includes a graphic LCD display and touch screen input capability would be capable of supporting both DDT and FCM command structures. Such a remote control would represent an extremely powerful user interface device, essentially becoming an extension of the controlled appliance in the user's hand. Also, since the HAVi standard allows an ongoing two-way dialog between the controlled and controlling devices, the remote control display and configuration can be updated dynamically during use of the system; not just at setup time as is the case with the basic "extended DAS" transaction described earlier.

FIG. 1a depicts a HAVi compliant entertainment equipment system equipped with such a remote control 10. In FIG. 1a, the user has just completed entering a new channel number into a DDI capable digital cable set top box (STB) 16. Under control of the STB 16, the remote control's 10 touch screen display is showing only those key functions needed to enter a new channel number. In addition the STB 16 has caused the remote control 10 to display to the user the station (ESPN) corresponding to the channel number just entered (e.g. 17). FIG. 9 shows a block diagram of the remote control interface unit 18. Interface unit 18 transfers data between HAVi compliant devices on the IEEE 1394 bus 30 and the remote control 10. Accordingly, interface unit 18 has both an IEEE 1394 bus interface module 19 for communication with the HAVi devices of FIG. 1a, and an infrared transceiver 21 for communication with the remote control 10.

In interface unit 18, the IEEE 1394 interface 19 is connected through a microcontroller 20 through IR protocol controller 22 to IR transceiver 21. Microcontroller 20 controls both the interface 19 and the IR transceiver 21. More specifically, microcontroller 20 is a general purpose microcontroller programmed to effect the orderly transfer of data between the IEEE 1394 interface 19 and the IR transceiver 21.

The IEEE 1394 interface 18 can be implemented using one of several specialized integrated circuit chip sets available for this purpose, for example a Texas Instrument TSBI2LV31 Link layer Controller together with a TSB21LV03 Transceiver/Arbiter. Other equivalent parts are available and are well known in the art. The communication system linking to the remote control may be IR or RF (of the type previously described) or, if a greater data throughput is desired in order to handle large icon definition bitmaps, a high speed link level protocol such as IRDA Control IR, a standard protocol defined by the Infrared Data Association may be used. Integrated IR transceivers are available for this standard, for example, the Sharp GP2W200IYK, the link layer control protocol can be implemented either in the micro controller or via a separate protocol chip such as the IRDA Control Peripheral Engine of the Sharp Co. Another possible choice is the TWIRP (Two Way IR Protocol) from SolutioNet Ltd., using, for example, the AT435TS00 TWIRP station transceiver available from SolutioNet.

The microcontroller 20 can be any suitable general purpose processor. A function of the firmware program in this device, after initializing the two interfaces (IEEE 1394 and IR communication) in accordance with their standard hardware software requirements, is to monitor the two interfaces for messages and to relay any data received from one onto the other. In this particular implementation, it is desirable to also segment any long HAVi data streams into 8-byte blocks since this is the maximum data payload of a single IR transmission frame. If IRDA Control, mentioned above, is used, a payload of up to 97 bytes is possible, so a larger block size can be used by the micro controller.

Interpretation of the HAVi data can be performed by the remote control, since in this particular embodiment the remote control has considerably more processing power than is available in the RCI unit. However, in other implementations it may be more efficient to pre-process some or all of the HAVi data within the RCI unit. For example, if the remote control has a low resolution display with a limited number of pixels available for each icon displayed, pre-processing HAVi icon bitmaps into compressed representations prior to transmission to the remote would more efficiently utilize transmission channel bandwidth as well as conserve memory in the remote control.

DETAILED DESCRIPTION OF SELECT EMBODIMENTS

From the foregoing it will be understood that the present invention includes a method for setting up a control unit for operation with a device to be controlled. The method comprises the steps of transmitting from the control unit to the device to be controlled a request for configuration information; and transmitting a list of controllable functions of the device to be controlled from the device to be controlled. In the embodiment shown in FIG. 1b, the remote control 10 is shown sending a request for information 32, and the TV 12 is shown transmitting information 34 to the remote control 10. The method also comprises recognizing a set of function indicators 36 (See FIG. 1a) each of said indicators 36 corresponds to a respective function to be controlled from the listing of controllable functions (See FIGS. 4a, 4b, and 5); mapping said functions into specific codes and keys according to said listing of controllable functions of said device; and storing the resultant configuration information for use.

In some embodiments it is desirable that the step of storing the resultant configuration information include the step of storing the information in the control unit. In some embodiments the set of function indicators is a single set of respective standard feature indicators, each standard feature indicator comprising a respective icon corresponding to the respective function to be controlled. For example, the POD, Volume-Up and Volume-Down keys corresponding to a TV.

Figure 8A:
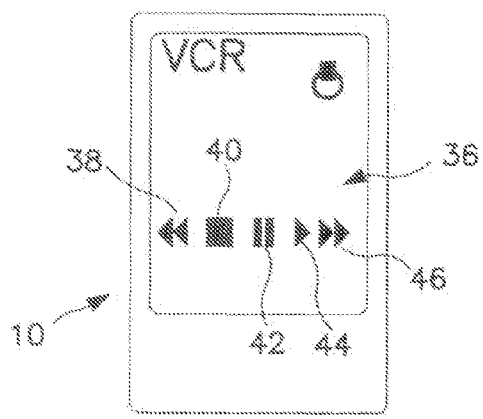
FIGS. 8a-8d show in pictorial sketches, the touch screen displays for four example device codes. Different function capability for a VCR is shown in the different figures. The graphical-dynamically-alterable display present the user with a less cluttered "keyboard."
Figure 8B:
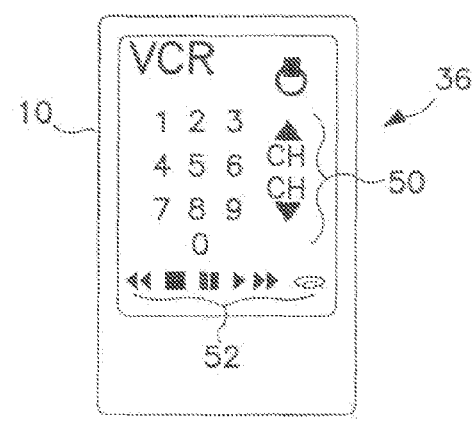
Figure 8C:
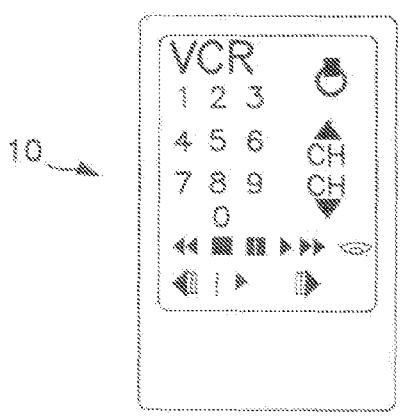
Figure 8D:
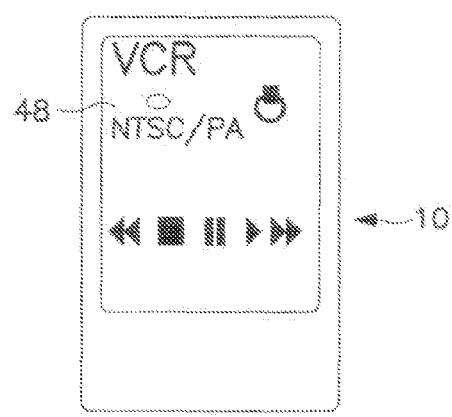

It is also desirable in some embodiments that each respective icon is a unique icon within the single set of respective standard features indicators. This reduces ambiguity and provides the user with quick selection capability. Another method of reducing the complexity of the controlling unit includes the step of displaying on the control unit only function indicators corresponding to respective functions to be controlled from the listing of controllable functions of the device to be controlled. Referring to FIG. 8a, the remote control 10 shows function indicators comprising a rewind icon 38, a stop icon 40, a pause icon 42, a play icon 44, and a fast forward icon 46. Since these are the only functions desired to be controlled, for example, with this particular VCR the user is presented with a control unit having substantially reduced apparent complexity. This eases the users' selectivity by reducing extraneous information. Referring to FIG. 8d, a protocol icon 48 is also displayed.

It will be understood that the listing of controllable functions may be divided into a plurality of families and the single set of function indicators may be divided into a corresponding plurality of families. Accordingly, the step of displaying may include displaying only the family of indicators corresponding to the family of functions to be controlled. For example, the indicators 36 of FIG. 8b have been divided into a TV family 50 and a VCR family 52.

It will be understood that in some embodiments, the step of transmitting comprises the step of conveying configuration information between the control unit and the device to be controlled (also referred to herein as a target device) via an encoding scheme in a communications protocol. It will often be desirable to utilize an industry standard protocol and it will often be desirable to provide compatibility by utilizing a consumer electronics standard for the control unit and for the interface device communication. As discussed earlier, one consumer electronics standard is a HAVi standard.

In a preferred embodiment, the set of variable functions is defined for each device to be controlled and the unique numeric identifier is assigned to each function. It may be desirable to group the related variable functions under a single designator. It is often desirable to reserve at least one code for indicating that data following the code is a definition of a new IR code and corresponding key annotation.

The invention also includes a control system 60 of electronically controlled devices, see FIG. 1a. In one embodiment, the inventive system comprises a standard high performance bus 30 connecting the electronically controlled devices (See FIG. 1a). FIG. 1a shows an embodiment wherein the electronically controlled devices constitute a home entertainment system 11 including a VCR 14, a TV 12, an audio source 54, a DVD 56, and a CD player 58. In the embodiment shown in FIG. 1a, the remote control 10 communicates with the electronically controlled devices via the remote control interface unit 18. FIG. 1b shows an embodiment wherein the remote control 10 communicates with the electronically controlled device directly.

The control system designated with reference number 60, in FIG. 1a includes a signal responsive of universal remote control 10 providing a user interface; and an interface adaptor 18 communicating with the bus 30. In FIG. 1a, the interface adaptor 18 is a remote control interface 18. Refer now to FIG. 9, depicting an exemplary interface adaptor 18. The interface adaptor 18 shown in FIG. 9 includes a signal transceiver 21, a bus interface unit 19, and a microcontroller 20. The components in FIG. 9 have been connected to control two-way communications between the signal transceiver 21 and the bus interface unit 19 to selectively obtain capability information from one of the electronically controlled devices, e.g., the VCR 14, connected to the bus 30.

FIG. 9 also depicts two-way communications 62 between the remote control interface unit 18 and the remote (Not shown in FIG. 9). It is often desirable for the capability information obtained from the control devices to include function capability information.

Generally, although not required, the interface adaptor 18 is mechanically and electrically connected to the bus 30. In some select embodiments the bus 30 is a high speed digital serial bus which utilizes a communications standard consistent with the home audio-video interoperability (HAVi) standard. Accordingly, it is generally desirable for the remote control to be adapted to issue user commands to one of the electronically controlled devices through the interface adaptor.

The invention also includes a method for controlling electronically controlled devices by a universal remote control. This method includes the steps of interconnecting the devices using a standard high performance bus to enable communication between the devices at a digital level. An interface adaptor is connected to the bus and provided with the capability of communicating by IR to a universal remote control. Generally, the method includes soliciting information from the devices on the bus and communicating the solicited information via a two-way communication link between the universal remote control and the devices to control at least one of the devices via the universal remote control. Thus, the interface adaptor provides a go between for the communication.

It will be understood from the foregoing that the present invention also envisions a control system comprising a plurality of devices connected via a bus conforming to a first standard, wherein the devices communicate according to a second standard. The plurality of the devices include a target device having data driven interaction data (DDI Data), that is context determined data, defining a plurality of functions supported by the target device and a plurality of associated icons. An adaptor is placed in operable communication with the bus to receive the DDI Data from the target device and send the DDI Data to the target device. A remote control is placed in operable communication with the adaptor to send and receive the DDI Data. In some specific embodiments the bus is a serial bus, and the first standard is an IEEE1394 standard. It may be desirable to have the target device configure the remote control. It is also often desirable for the remote control to comprise a display wherein the target device displays at least one of the plurality of associated icons on the display of the remote control. The remote control often comprises at least one configured function defined by the target device and a display displaying an icon standard with at least one configured function.

It will often be desirable for the adaptor to comprise means to identify itself to the target device as a unit having display and control input capabilities, even though the adaptor does not provide display and control input capabilities. This allows the adaptor to act as a conduit between the target device and the remote control, wherein the remote control does have display and controlling capabilities.

It will be understood that in some embodiments the system comprises a two-way wireless link connecting the adaptor and the remote. In some embodiments it is desirable for the wireless link to include a radio frequency link or an infrared (IR) link. Such a two-way link is depicted in FIG. 9 and also referred to a two-way communication 62. While the adaptor 18 has been shown separate from the plurality of devices connected via the bus 30 for ease of illustration, it will be understood that the adaptor 18 may be housed in one of the plurality of devices.

As stated above, the second standard may be a HAVi standard and the first standard may be an IEEE1394 standard. It is often desirable to provide the remote control with a dynamical-graphical-user interface connected to change display graphics according to a status of the target device. In a preferred embodiment the remote control comprises means for receiving the status of a target device from the target device through the adaptor. The remote control may also comprise means for directly controlling the target device. Thus, the icon may be dynamically altered in response to communications with one of the devices.

While the invention has been particularly shown and described with reference to a particular embodiment thereof it will be understood by those skilled in the art that various changes in form and detail may be made therein without departing from the spirit and scope of the invention.

All of the cited patents and patent applications are hereby incorporated by reference in their entirety.

What is claimed is:

1. A method for using a controlling device to command functional operations of a controllable appliance, comprising:
    causing an adaptor to issue a communication to the controllable appliance wherein the adaptor identifies itself to the controllable appliance as a device having control capabilities which are unsupported by the adaptor;
    receiving at the controlling device from the controllable appliance, via a first communication channel in which the controllable appliance is indirectly communicatively coupled to the controlling device via the adaptor acting as a conduit between the controlling device and the controllable appliance, a control capabilities related communication intended for the adaptor; and
    using the control capabilities related communication intended for the adaptor to configure the controlling device whereby, in response to activation of one or more command keys of the controlling device, the controlling device will be caused to transmit to the controllable appliance, via a second communication channel in which the controlling device is directly communicatively coupled to the controllable appliance, those commands selected from a library of commands that are appropriate for commanding functional operations of the controllable appliance.

2. The method as recited in claim 1, wherein the adaptor is communicatively coupled to the controllable appliance via a wired communication channel and wherein the adaptor is communicatively coupled to the controlling device via a wireless communication channel.

3. The method as recited in claim 2, wherein the wired communication channel comprises a bus.

4. The method as recited in claim 1, wherein the adaptor comprises a set top box.

5. The method as recited in claim 1, wherein the second communication channel comprises a wireless communication channel between the controlling device and the controllable appliance.

6. The method as recited in claim 5, wherein the wireless communication channel comprises an IR communication channel.

7. The method as recited in claim 4, wherein the second communication channel comprises a wireless communication channel between the controlling device and the at least one controllable appliance.

8. The method as recited in claim 7, wherein the wireless communication channel comprises an IR communication channel.

9. The method as recited in claim 1, wherein the library of commands are stored in a memory of the controlling device.

10. The method as recited in claim 1, wherein the control capabilities related communication intended for the adaptor comprises data indicative of a type of the controllable appliance.

11. The method as recited in claim 1, wherein the control capabilities related communication intended for the adaptor comprises data indicative of a manufacturer of the controllable appliance.

12. The method as recited in claim 1, wherein the control capabilities related communication intended for the adaptor is used to configure a graphical user interface of the controlling device, the graphical user interface comprising the one or more command keys.

13. The method as recited in claim 1, wherein the control capabilities related communication intended for the adaptor is exclusive of remote control command codes.

14. The method as recited in claim 13, wherein the control capabilities related communication intended for the adaptor comprises data representative of functional capabilities of the controllable appliance.

15. The method as recited in claim 13, wherein the controllable appliance is a display device.

16. The method as recited in claim 15, wherein the controllable appliance comprises a television.

17. The method as recited in claim 13, wherein the control capabilities related communication intended for the adaptor is used to configure a graphical user interface of the controlling device.

18. The method as recited in claim 13, wherein the control capabilities related communication intended for the adaptor comprises an identity of the manufacturer of the controllable appliance.

19. The method as recited in claim 1, further comprising:
    causing the adaptor to issue a communication to the controllable appliance wherein the adaptor identifies itself to the controllable appliance as a device having display capabilities which are unsupported by the adaptor;
    receiving at the controlling device from the controllable appliance, via the first communication channel in which the controllable appliance is indirectly communicatively coupled to the controlling device via the adaptor acting as a conduit between the controlling device and the controllable appliance, a display capabilities related communication intended for the adaptor; and
    using the display capabilities related communication intended for the adaptor to effect a display of information on a display of the controlling device.

20. A method for using a controlling device to command functional operations of a controllable appliance, comprising:
    causing an adaptor to issue a communication to the controllable appliance wherein the adaptor identifies itself to the controllable appliance as a device having display capabilities which are unsupported by the adaptor;
    receiving at the controlling device from the controllable appliance, via a communication channel in which the controllable appliance is indirectly communicatively coupled to the controlling device via the adaptor acting as a conduit between the controlling device and the controllable appliance, a display capabilities related communication intended for the adaptor; and
    using the display capabilities related communication intended for the adaptor to effect a display of information on a display of the controlling device.

21. The method as recited in claim 20, wherein the display capabilities related communication intended for the adaptor causes the controlling device to display a graphical user interface for commanding functional operations of the controllable device.

* * * * *